United States Patent [19]

Dufrenne

[11] Patent Number: 5,081,338
[45] Date of Patent: Jan. 14, 1992

[54] APPARATUS AND METHOD FOR MONITORING WELD QUALITY

[75] Inventor: Gerald Dufrenne, LaVerne, Calif.

[73] Assignee: Unitek Equipment Inc., Monrovia, Calif.

[21] Appl. No.: 655,827

[22] Filed: Feb. 15, 1991

[51] Int. Cl.⁵ .............................................. B23K 11/25
[52] U.S. Cl. ................................................... 219/109
[58] Field of Search ................................. 219/109, 110

[56] References Cited
U.S. PATENT DOCUMENTS

| | | | |
|---|---|---|---|
| 3,389,239 | 6/1968 | Treppa et al. | 219/110 |
| 4,449,028 | 5/1984 | Buxton | 219/109 |
| 4,963,830 | 10/1990 | Roth et al. | 219/109 |

Primary Examiner—Clifford C. Shaw
Attorney, Agent, or Firm—Christie, Parker & Hale

[57] ABSTRACT

An apparatus and method for monitoring weld quality and for establishing a proper amount of weld energy and the upper and lower limits of the proper weld energy to be supplied by a precision resistance welding apparatus in order to produce acceptable welds. In the present apparatus and method the difference between the change in voltage and current supplied to a test weld is compared to a reference weld and this difference is used to obtain the upper and lower limits of the proper amount of energy to be supplied by the welder in a production context.

17 Claims, 4 Drawing Sheets

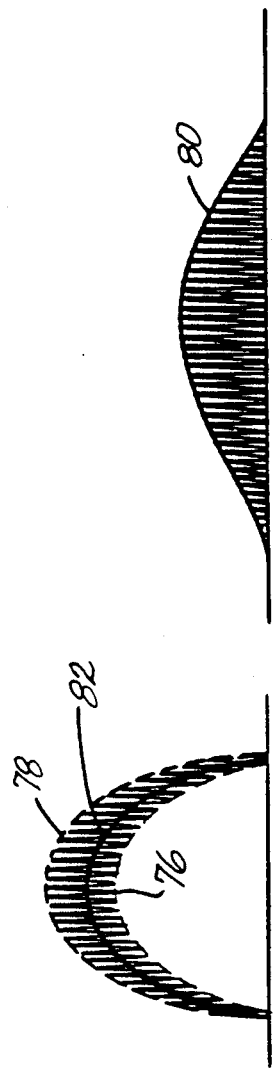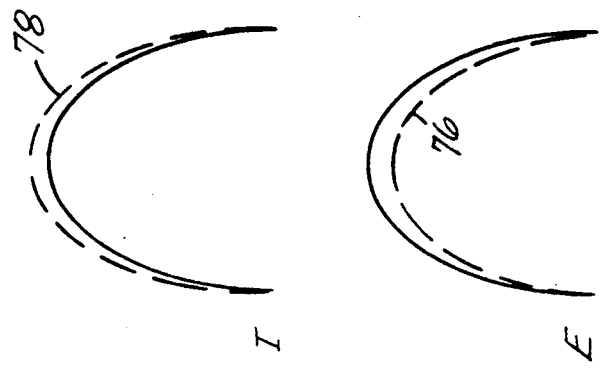

APPARATUS AND METHOD FOR MONITORING WELD QUALITY

FIELD OF THE INVENTION

The present invention relates to precision resistance welding apparatus and, in particular, to methods for monitoring the quality welds to enable establishment of a weld schedule so as to deliver an amount of energy to each weld site which is maintained between precisely determined limits.

BACKGROUND OF THE INVENTION

Precision welders are widely used in electronic fabrication operations. In the assembly of modern electronic components, extremely fine wires are connected from electronic components to circuit interconnection points on, for example, printed circuit boards. It is important to be able to control and deliver a precise amount of energy to each weld site in order to obtain a truly acceptable, electrically sound interconnection of these wires to their interconnection points.

It is equally well known that the physical parameters of each weld job have a tendency to vary due to a number of factors, including the presence of dirt or dust particles, oxidation and finish of the wire surface or the surface of the interconnection point, and variations in wire diameter and in the electrical resistance of the wire and the connection point. Such variations in the weld site conditions, of necessity means that the precise amount of energy needed is likely to vary from site to site and job to job.

In order to obtain uniform, repeatable, metallurgically acceptable welds, therefore, a precision welder must be operated in a way that recognizes that there will be differences in resistance from weld site to weld site. Typically, the site to site resistance may vary from 50% to 200% from the normal. These variations in electrical resistance in turn produce variations in the amount of energy delivered to the weld site. Most weld monitors depend upon measuring the delivered energy and, in some form, deciding on the basis of this measurement whether a weld will be good or bad. These energy measurements, in engineering terms, are expressed as peak volts, peak amps, volt-seconds, amp-seconds, and watt-seconds.

All these values are useful measures of energy, but if the weld resistance changes, the energy delivered to the weld site may not change appreciably. For instance, when the resistance increases, the voltage will increase, but the current will decrease. Thus, the product of voltage and current (watts or watt-seconds) will only show a change smaller than the change in either volts or amps.

In addition to the above factors, many other factors also affect weld resistance. Among these parameters are changes in the materials being welded, the weld temperature, plating thickness, electrode pressure, electrode diameter and surface area. Each change in such parameters produces a change in weld resistance. It would be extremely desirable therefore to be able to monitor resistance change, but measurement of resistance using electronic circuit means is difficult to achieve, involving as it does the arithmetic operation of division, in this case, division of the voltage drop across the weld by the current through the weld. In contrast, the arithmetic operations of addition, subtraction and multiplication of voltages and currents ar relatively easy to achieve electronically.

Variations in resistance from one weld site to the next will cause variation in the magnitude of the instantaneous electrical power delivered to the weld sites if the same amount of instantaneous drive current is delivered to the weld sites. Producing a strong, metallurgically acceptable weld depends upon adhering to a weld schedule to deliver the right amount of energy within the right amount of time. Failure to deliver the proper amount of energy to the weld sites results in welds which are weak and unacceptable.

In general, precision resistance welders include adjustment controls to enable an operator to select the desired setting for the magnitude and duration of the energy that the spot welder will supply in a weld site. In a production setting, the actual weld resistance is not measured each time.

A method of measuring weld resistance is to pass a known d.c. test current through the series path defined by the welding electrodes of the spot welder and the weld site, and measure the resulting voltage that is developed across the welding electrodes. However, this technique may be insufficiently sensitive since voltage changes tend to produce opposite changes in current which, when translated into power changes result in little or no significant change in the energy delivered to the weld, even though the actual resistance of the weld may have changed significantly from its normal value, e.g. an increase to 30 milliohms or a decrease to 7.5 milliohms from a nominal value of 15 milliohms.

SUMMARY OF THE INVENTION

The present invention provides a welding apparatus and method incorporating the ability to monitor the resistance of each weld site with greatly improved sensitivity. This improved sensitivity enables the monitoring and maintenance of weld quality in a consistent manner in comparison to the prior art.

The apparatus comprises electrode means for contacting elements to be bonded together and a source of electric power connected to the electrode means for supplying welding energy to the electrodes. First amplifying means are provided for measuring and amplifying the input weld voltage, and second amplifying means are provided for measuring and amplifying the input weld current. Third means are provided to determine and amplify the difference between the amplified weld voltage and amplified weld current whereby the magnitude of the difference between the amplified voltage and current measures the change in resistance at the weld site relative to a reference resistance.

The invention also provides a method for monitoring variation in weld resistance in a precision welder. In this aspect of the invention, the method comprises a method for monitoring change in parameters of a weld in a resistance welding apparatus, comprising the steps of measuring a first voltage drop across a reference weld and measuring a first current through the reference weld. This is followed by the steps of measuring a second voltage drop across a test weld and measuring a second current through the test weld. The first current is subtracted from the first voltage to provide a reference value, and the second current is subtracted from the second voltage to provide a change value. The reference value and the change value are then compared to determine the change in weld parameters.

The present invention provides an accurate and very sensitive apparatus and method for monitoring the quality of a weld produced by a resistance welder. The present invention distinguishes between good and bad welds by measuring the changes in voltage across the weld and current through the weld being compared in an extremely sensitive manner. This is accomplished by amplifying the weld voltage and current signals to approximately the same level, and then subtracting one from the other. Since a change in resistance causes the voltage and current signals to change in opposite directions, the difference between the two becomes an even more sensitive indication of resistance change.

The foregoing and other distinguishing advantages and features of the present invention are described in more detail below.

BRIEF DESCRIPTION OF THE INVENTION

FIG. 4A is a wave diagram illustrating changing voltage and current waveforms producing a small change in energy delivered;

FIG. 4B are wave diagrams illustrating the change in energy as a function of difference between the change in voltage and the change in current.

DETAILED DESCRIPTION OF SPECIFIC EMBODIMENTS

In order to enhance the sensitivity of weld monitoring, the present invention provides a circuit for use with a precision welder or a weld monitor which measures both the weld voltage and the weld current, and then electrically measures the difference between these two values in order to develop a signal representative of the change in resistance from a nominal value at the weld site. A precision spot welder typically has a pair of weld electrodes and that are placed in position to contact and exert pressure on a weld site. An energy source included in the welder provides welding energy to the weld electrodes. A suitable energy source is described and claimed in U.S. Pat. No. 4,228,340 in the name of the present inventor.

Figure 1:
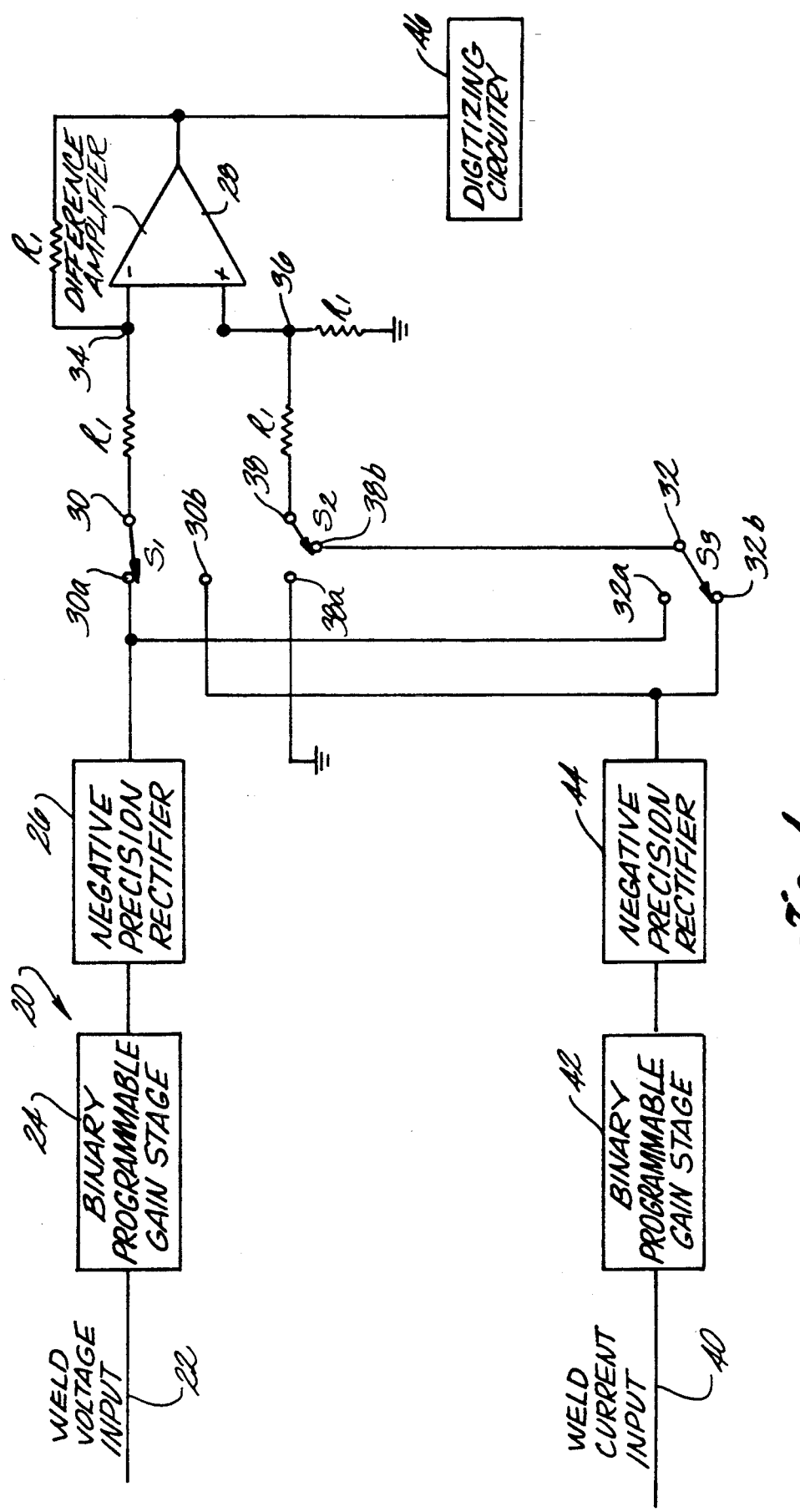
FIG. 1 is a block and schematic diagram showing a first embodiment of the invention.

A monitoring circuit 20 according to the present invention is shown in FIG. 1. A signal 22 representative of the input weld voltage is connected to a binary programmable gain stage 24, where it is amplified and transmitted to a negative precision rectifier 26. The output of rectifier 26 is selectively connectable to a difference amplifier 28 through a first switch 30 or a second switch 32 to a negative input terminal 34 or a positive input terminal 36. Switch 30 is movable between two switch positions 30a and 30b. Switch 32 is movable between two positions 32a and 32b. A third switch 38 is provided and is movable between two positions 38a and 38b and is used for switching the monitoring circuit of the present invention in and out of the differential mode of operation. When switch 38 is in position 38b, the monitoring circuit is in the differential mode of operation according to the present invention. In position 38a, the output from rectifier circuit is in the nondifferential mode and is incapable of measuring the differences between the input weld voltage and weld current.

A signal 40 representative of input weld current is connected to a second binary programmable gain stage 42 and the amplified output thereof is transmitted to a second negative precision rectifier 44 where the output of rectifier is selectively connectable by first and second switches 30, 32 to one of the input terminals of difference amplifier 28. With the switches 30 and 32 in the positions shown in FIG. 1, the circuit according to the present invention measures the difference between the input weld voltage and input weld current. With switch 30 in position 30a and switch 32 in position 32b, a circuit measures the difference between voltage and current, depending upon which is greater. The output of amplifier 28 is connected to digitizing circuit 46 where the difference signal is converted to digital form.

Figure 2:
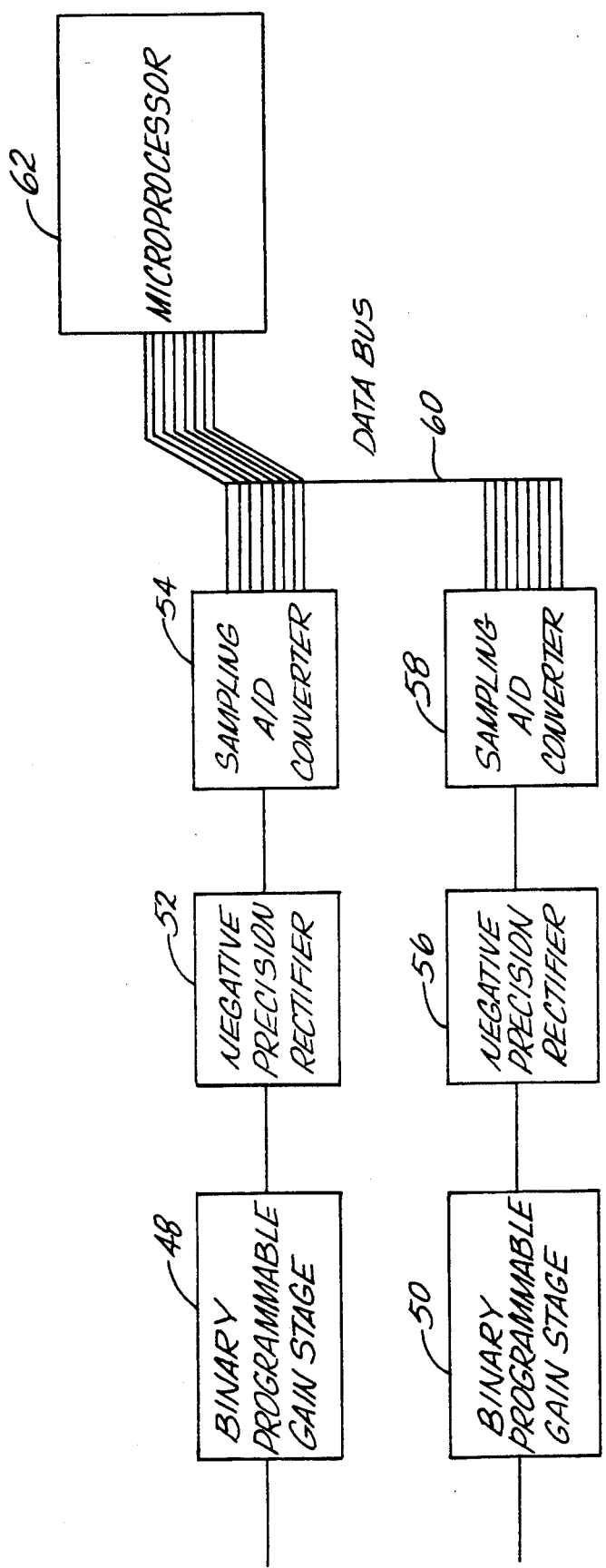
FIG. 2 is a block and schematic diagram showing a second embodiment of the invention.

In an alternate embodiment of the monitoring circuit of the present invention as shown in FIG. 2, the difference amplifier and digitizing circuitry of FIG. 1 is replaced by analog to digital (A-D) converters and a microprocessor. As shown therein, this circuit includes a first binary programmable gain stage 48 for receiving a signal representative of input weld voltage and a second binary programmable gain stage 50 for receiving a signal representative of input weld current. Stage 48 is connected to a first negative precision rectifier 52, which in turn is connected to a first A-D sampling converter 54. Stage 50 is connected to a second negative precision rectifier 56, which in turn is connected to a second A-D sampling converter 58. The outputs of converters 54, 58 are connected to a data bus 60 with the opposite side of bus being connected to the input to microprocessor 62.

In operation, the weld voltage and current signals are amplified at the binary programmable gain stage. The amplified AC signal is then rectified and one rectified signal is subtracted from the other by the difference amplifier or the microprocessor.

As will be demonstrated below, a change in weld resistance or electrode resistance produces a change in weld voltage and current. An increase in resistance produces an increase in voltage and a decrease in current. In this instance, current is subtracted from voltage to produce a signal representative of the resistance change. Although the change in resistance may be small, producing small changes in voltage and current, the difference between the two values is relatively large, thereby producing a signal which is extremely sensitive to resistance changes and easily measurable.

A decrease in resistance produces a decrease in voltage and an increase in current. In this instance, the voltage is subtracted from the current after amplification to produce a signal representative of the resistance change; in this case, a decrease. Again, although the resistance change may be small, the difference between the two values is relatively large in both terms and percentage wise. What results again is a value which is precisely measurable.

Figure 3A:
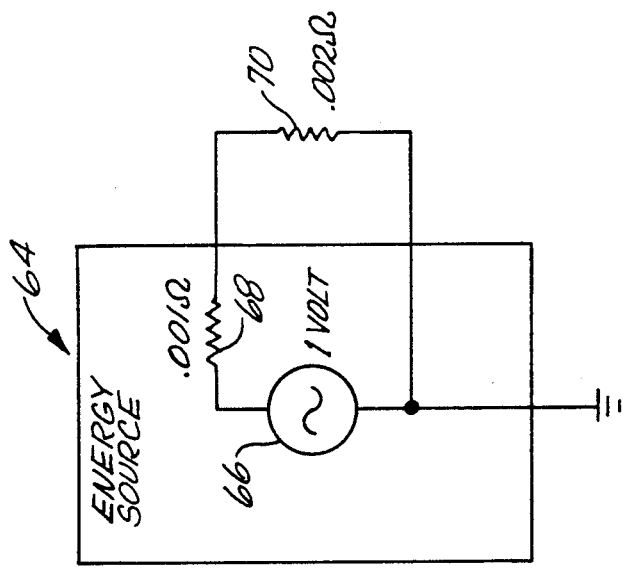
FIG. 3A is a simplified schematic diagram of a precision welder showing an energy source connected to a sample weld head.

The schematic diagram of FIG. 3A together with the equivalent circuit diagram is used to illustrate the operating principle of the invention. A welding energy source 64 comprises a one volt power supply 66 and an internal resistance 68 of 0.001 ohms. To this energy source is connected a weld load 70 having a resistance of 0.002 ohms.

Figure 3B:
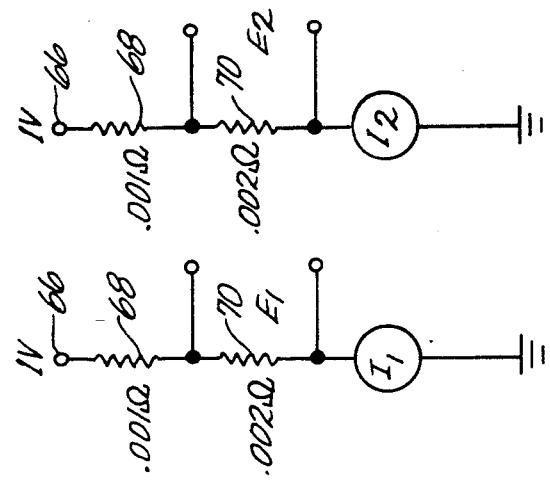
FIG. 3B is an equivalent circuit schematic used to demonstrate the principle of operation of the welder according to the present invention.

Referring now to the equivalent circuits, in FIG. 3B, the one volt source 66 is connected to resistance 68 and then to load 70. Such a circuit produces a voltage drop $E_1$ across resistance 70 and a current I.

If the hypothetical weld resistance 70 changed by 10% from 0.002 ohms to 0.0018 ohms as is shown in the second equivalent circuit, a voltage drop $E_2$ is produced which is approximately 3.6% less than $E_1$. Since the resistance of the load decreased, the current $I_2$ increases and can be shown to be 7.1% greater than $I_1$. Power calculations using these values result in a net energy increase being supplied to the load of 3.3%, a very small change in energy when compared to the 10% change in resistance of load resistance 70. However, if the voltage drops E, and $E_2$ are multiplied by a factor of 600 and the current values I, and $I_2$ subtracted from $E_1$, and $E_2$ respectively, $E_2 - I_1$ is now 233% greater than $E_1 - I_1$, a change which is much more readily detected and measured.

The wave diagrams of FIG. 4A and 4B further illustrate the nature of the sizeable change that results when the amplified values of the voltage and/or current are subtracted, one from the other.

As shown in FIG. 4A, the waveform of the voltage and current of the circuit of FIG. 3A is shown by the solid lines 72, 74. If the resistance 70 decreased by 10%, the voltage decreases as shown by the broken waveform at 76 and the current increases as shown by the broken waveform at 78. For relative comparison purposes, these waveforms 78, 76 are also shown in FIG. 4B and the shaded areas 80 between the two waveforms illustrates how the magnitude of the difference between current and voltage or voltage and current is substantially greater than the change in energy supplied to the weld. This thereby makes the measurements (when weld resistance changes) of a magnitude that is more readily measured and allows more precise decisions to be made as to weld energy acceptability. The shaded area 82 is a representation of the measurement of the difference between the current waveform 78 and the voltage waveform 76.

The present invention provides an apparatus and a method for measuring the energy supplied to produce a good weld and comparing this value with the energy supplied to a weld location at which a "bad" i.e. an unacceptable weld has been produced to thereby permit the user to optimize the voltage and current values before a production run using a precision resistance welder occurs. In practice, good welds and bad welds are physically compared to specifically identify those welds which are considered unacceptable, that is, those that lack the required strength and integrity. The amount of the energy which is supplied to the good and bad welds is noted can be determined by using a weld monitor. A weld monitor such as the Unitek Equipment weld monitor Model 3-128-01 incorporating the circuitry of the present invention is suitable in such an application.

Limits above and below the optimum voltage and current values are then established. The production welding apparatus is then set up with the proper weld schedule, i.e. voltage, current and electrode pressure settings are input before the onset of production. During production, if the energy actually supplied is outside the established limits, an alarm is sounded or the part is automatically rejected.

Many variations and modifications are possible with respect to the teachings of the present invention as described above. Thus, the scope of the invention should be determined from the appended claims and not solely from the detailed description above.

What is claimed is:

1. A method for monitoring change in weld resistance of a test weld produced by a resistance welding apparatus comprising the steps of:
   1) measuring a first voltage drop across a reference weld;
   2) measuring a first current through the reference weld;
   3) measuring a second voltage drop across the test weld;
   4) measuring a second current through the test weld;
   5) Obtaining the difference between said first current and said first voltage to provide a reference value;
   6) obtaining the difference between said second current and said second voltage to provide a change value; and
   7) comparing said change value to said reference value to determine the magnitude of change in weld resistance.

2. The method according to claim 1 wherein the first voltage drop or first current are selectively amplified such that said voltage drop and current are approximately at the same level prior to the obtaining the difference step.

3. The method according to claim 2 wherein the second voltage drop or second current are selectively amplified such that said voltage drop and current are approximately at the same level prior to the obtaining the difference step.

4. The method according to claim 3 wherein the second voltage drop is input to a second gain stage and thereafter coupled through an analog to digital converter to a microprocessor.

5. The method according to claim 4 wherein the second current is input to a second gain stage and thereafter coupled through an analog to digital converter to a microprocessor.

6. The method according to claim 5 wherein the microprocessor compares the first voltage drop to the first current and second voltage drop to the second current to provide a readout of the difference in weld resistance of the test weld relative to the reference weld.

7. The method according to claim 4 wherein the second current is input to a second gain stage and thereafter coupled through a rectifier to a difference amplifier and digitizing circuitry.

8. The method according to claim 7 wherein the difference amplifier compares the first voltage drop to the first current and second voltage drop to the second current to provide an output representative of the difference in weld resistance of the test weld relative to the reference weld.

9. The method according to claim 3 wherein the second voltage drop is input to a second gain stage and thereafter coupled through a rectifier to a difference amplifier and digitizing circuitry.

10. The method according to claim 2 wherein the first voltage drop is input to a first gain stage and thereafter coupled through an analog to digital converter to a microprocessor.

11. The method according to claim 10 wherein the first current is input to a first gain stage and thereafter coupled through an analog to digital converter to a microprocessor.

12. The method according to claim 10 wherein the first current is input to a first gain stage and thereafter coupled through a rectifier to a difference amplifier and digitizing circuitry.

13. The method according to claim 2 wherein the first voltage drop is input to a first gain stage and thereafter coupled through a rectifier to a difference amplifier and digitizing circuitry.

14. A weld monitoring apparatus comprising:
   electrode means for contacting elements to be bonded together;
   a source of electric power connected to the electrode means for supplying welding energy thereto;
   binary programmable amplifying means for selectively amplifying the weld voltage input and the weld current input;
   negative precision rectifying means for further processing the weld voltage and weld current; and
   means for determining the difference between the amplified voltage and current, the magnitude of the difference thereby indicating the change in weld resistance relative to a reference resistance.

15. The method according to claim 14 wherein the difference determining means is a difference amplifier connected at its input side to the voltage and current received from the rectifiers and at its output side to digitizing circuitry for display.

16. The method according to claim 14 wherein the voltage from the rectifiers connected to a sampling analog to digital (A-D) converter and thereafter via bus means to a microprocessor.

17. The method according to claim 16 wherein the current from the rectifiers is connected to a sampling analog to digital (A-D) converter and thereafter via bus means to a microprocessor.

* * * * *